S. F. SOSEBEE.
STALK CUTTER.
APPLICATION FILED NOV. 11, 1913.
1,128,539.
Patented Feb. 16, 1915.
2 SHEETS—SHEET 1.
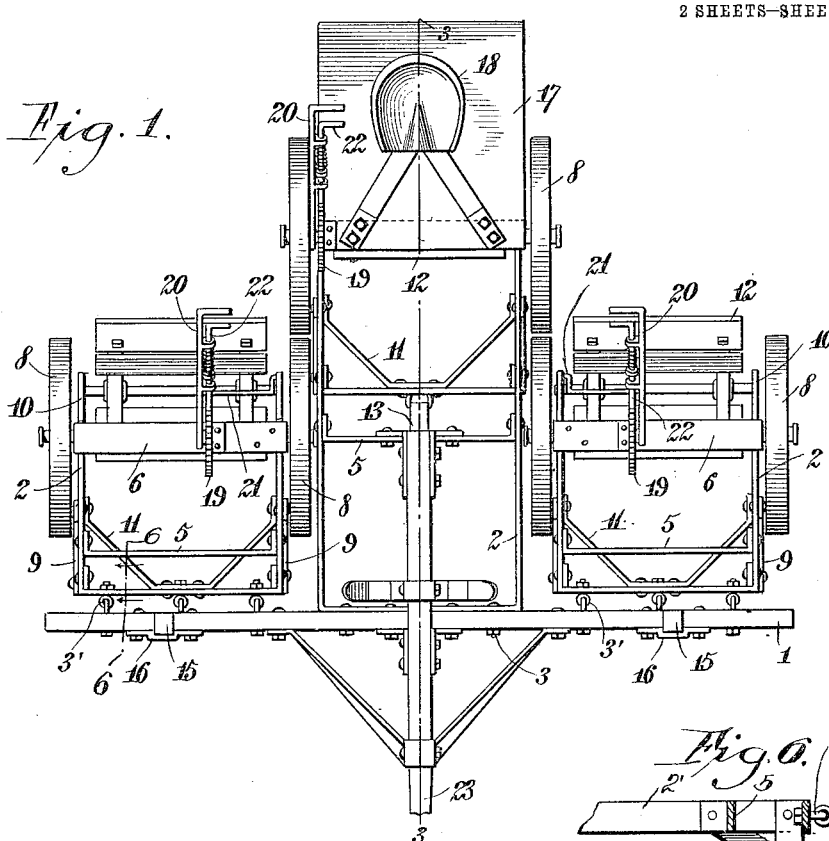
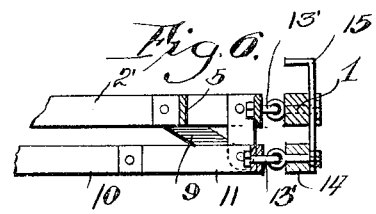
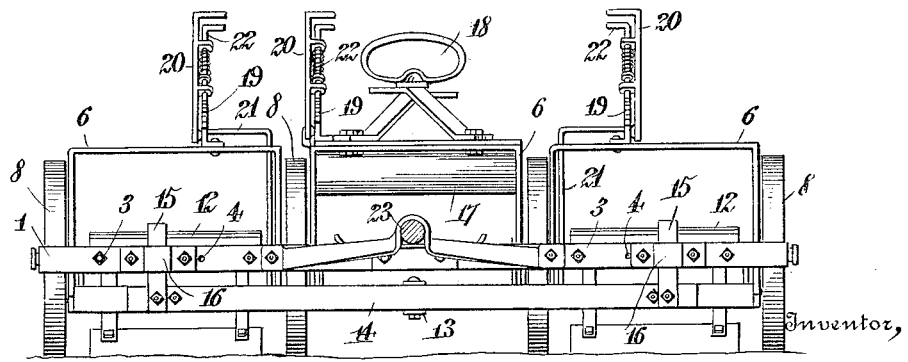
Witnesses:
Christ Feinle, Jr.
Inventor,
S. F. Sosebee.
By Victor J. Evans,
Attorney.

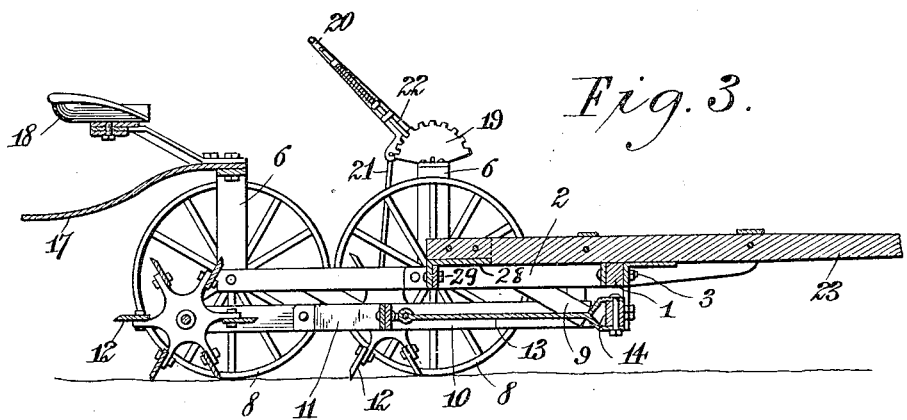
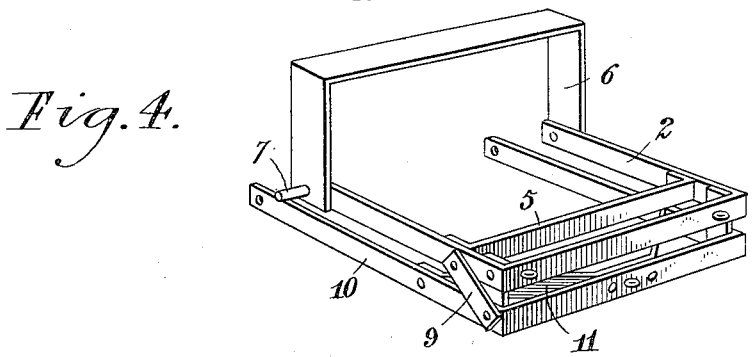
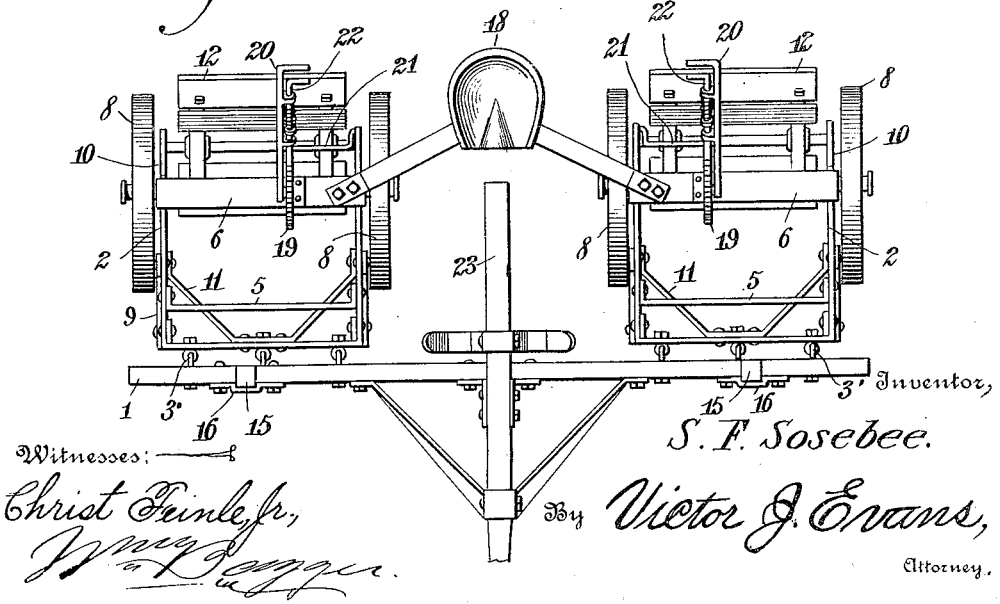

UNITED STATES PATENT OFFICE.

SURVETUS FORD SOSEBEE, OF BENJAMIN, TEXAS.

STALK-CUTTER.

1,128,539.  Specification of Letters Patent.  Patented Feb. 16, 1915.

Application filed November 11, 1913. Serial No. 800,366.

*To all whom it may concern:*

Be it known that I, SURVETUS F. SOSEBEE, a citizen of the United States, residing at Benjamin, in the county of Knox and State of Texas, have invented new and useful Improvements in Stalk-Cutters, of which the following is a specification.

This invention relates to stalk cutters, and it has for its object to produce a simple and inexpensive device of this character which may be utilized for operating on a plurality of rows for the purpose of cutting and chopping the stalks.

A further object of the invention is to produce a device of the character described which may be readily converted to provide an implement for operating on one, two or three rows, simultaneously, as may be desired.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a top plan view of a three-row stalk cutter constructed in accordance with the invention. Fig. 2 is a front elevation of the same. Fig. 3 is a central longitudinal vertical sectional view taken on the line 3—3 in Fig. 1. Fig. 4 is a perspective view showing one of the individual frames detached. Fig. 5 is a top plan view showing the machine converted to operate on two rows of plants. Fig. 6 is a sectional detail view taken on the line 6—6 in Fig. 1.

Corresponding parts in the several figures are denoted by like characters of reference.

1 designates a transverse main beam with which a plurality of U-shaped frames including an intermediate frame 2, and outer frames 2′ are connected by fastening means, such as bolts 3 and eye bolts 3′, the latter being preferably employed for connecting the outer frames 2′ with the frame beam. Each of the U-shaped frames is provided with a cross bar 5 and with a yoke 6, said yoke being connected with the limbs or side members of the frame adjacent to the rear end thereof. At the junction of the side members of each frame with the limbs of the yoke 6 stub axles or spindles 7 are provided on which transporting wheels 8 are mounted for rotation.

The limbs or side members of each frame 2 and 2′ are provided in advance of the supporting wheels 8 with downwardly extending brackets 9 with which auxiliary roller carrying frames 10 are pivotally connected. Said auxiliary frames are substantially U-shaped and are reinforced by means of braces 11, and said auxiliary frames support the rotary cutters 12 which may be of any well known and approved construction.

The forward end of the auxiliary roller carrying frame 10 associated with the intermediate frame 2 is connected by means of a link 13 with a draft bar 14 which is supported adjacent to the main frame bar 1, by means of hook-shaped straps 15 that slidably engage keepers 16 on the front face of the main bar. The forward ends of the roller carrying frames associated with the outer frames 2′ are likewise flexibly connected with the bar 13 by interengaging eyes 13′, see Figs. 1 and 6. This construction permits the draft bar to have a vertically slidable movement independently of the main frame bar, and the hook-shaped straps by engaging the top face of the main bar will prevent the draft bar from dropping.

The middle frame 2 is substantially identical in construction with the outside frames, but the limbs or side members of said middle frame are considerably longer than those of the outer frames, thereby causing the cutter carried by said middle frame to be disposed in rear of the cutters carried by the outside frames. The yoke 6 associated with the middle frame 2 supports a platform 17 and a seat 18 for the driver or operator. The yoke 6 of each of the several frames also supports a lever stand including a rack segment 19 and a lever 20 for effecting adjustment of the auxiliary or cutter carrying frame 10, which latter is connected with one arm of the lever by means of a link 21. Each lever 20 is provided with a suitable spring-actuated stop member 22 engaging the rack segment 19 for the purpose of securing the lever and related parts at various adjustments. The levers of the several frames are so arranged as to be in convenient proximity to the driver or operator who by means of said levers is enabled to move the rotary cutters into engaging or non-engaging position with respect to the ground. A tongue 23, which is supported on the main frame bar 1, may also be connected detachably with the cross bar 5 of the middle frame by means of a lug or bracket 28 and a bolt 29. An evener for the attachment of two, three or four horses may be connected with the draft bar 14, but the construction of such evener being well known and understood, it has not been deemed necessary to illustrate the same in the drawings.

From the foregoing description, taken in connection with the drawings hereto annexed, the operation and advantages of this invention will be readily understood. The individual frames 2 and 2' are of similar construction, the only difference being in the dimensions of the middle one, 2, of said frames, the limbs or side members of which are longer than those of the remaining frames, as has been herein described. The several frames are detachably connected with the main frame bar and with the draft bar in such a manner that the middle frame may be readily detached, as seen in Fig. 5, when the machine will straddle one row of stalks and operate on two rows adjacent to the row thus straddled. Any one of the frames may also be utilized independently of the remaining frames in case it shall be desired to operate on a single row. The advantage of operating simultaneously on as many as three rows will be readily understood, however, the three-row implement being readily drawn by four horses, while the single row implement requires two draft animals, and a two-row implement may be drawn by three animals. It is also evident that the three-row as well as the two-row implement requires only one operator, thereby effecting a very considerable saving in the labor of men and animals.

Having thus described the invention, what is claimed as new, is:—

1. In a device of the character described, a main frame bar, a plurality of individual U-shaped frames detachably connected therewith, auxiliary cutter carrying frames connected pivotally and adjustably with the U-shaped frames, a draft bar supported movably with reference to the main frame bar, and means flexibly connecting the draft bar with the auxiliary cutter carrying frames.

2. In a device of the character described, a main frame bar, a plurality of individual U-shaped frames connected therewith, each of said individual frames being provided with supporting wheels, an auxiliary cutter carrying frame connected pivotally and adjustably with each of the individual U-shaped frames, means for adjusting and supporting the cutter carrying frames with respect to the individual U-shaped frames, keepers on the front side of the main frame bar, a draft bar having hooked straps slidable in the keepers and adapted to engage the top face of the main frame bar to limit the downward movement of the draft bar, and means flexibly connecting the draft bar with the auxiliary cutter carrying frames.

In testimony whereof I affix my signature in presence of two witnesses.

SURVETUS FORD SOSEBEE.

Witnesses:
E. L. SOSEBEE,
A. B. SOSEBEE.

Copies of this patent may be obtained for five cents each, by addressing the "Commissioner of Patents, Washington, D. C."